United States Patent [19]

Winston

[11] Patent Number: 4,850,043

[45] Date of Patent: Jul. 18, 1989

[54] HIGH INTEGRITY OPTICAL DATA TRANSMISSION SYSTEM

[75] Inventor: Charles R. Winston, Canton, Conn.

[73] Assignee: United Technologies Corporation, Hartford, Conn.

[21] Appl. No.: 197,714

[22] Filed: May 23, 1988

[51] Int. Cl.[4] .............................................. H04B 9/00
[52] U.S. Cl. .................................... 455/607; 455/601; 455/612; 340/825.05; 370/86; 370/1
[58] Field of Search .......................... 370/1, 4, 86, 89; 455/601, 607, 606, 612, 600; 340/825.05; 375/36

[56] References Cited

U.S. PATENT DOCUMENTS

| | | | |
|---|---|---|---|
| 4,583,088 | 4/1986 | Bux et al. | 340/825.05 |
| 4,633,202 | 12/1986 | Basile et al. | 340/825.05 |
| 4,654,844 | 3/1987 | Mandello | 370/32 |

FOREIGN PATENT DOCUMENTS

| | | | |
|---|---|---|---|
| 3622348 | 1/1988 | Fed. Rep. of Germany | 455/612 |
| 0204643 | 11/1983 | Japan | 455/601 |
| 0112429 | 5/1987 | Japan | 455/600 |

OTHER PUBLICATIONS

"Military Avionic LANs Point Toward Fiber Optics" by Matthew J. Relis, *Defense Electronics*, Oct. 1983, pp. 87–106.
Military Standard 1553B–Aircraft Internal Time Division Command/Response Multiplex Data Bus, Notice 1(USAF), Feb. 17, 1980, U.S. Govt. Printing Office, pp. 1–35.
Proposed Military Standard 1773, Aug. 26, 1982, Fiber Optics Mechanization of an Aircraft Internal Time Division Command/Response Multiplex Data Bus pp. 1–30.

*Primary Examiner*—Robert L. Griffin
*Assistant Examiner*—Andrew J. Telesz, Jr.
*Attorney, Agent, or Firm*—M. P. Williams

[57] ABSTRACT

A high integrity optical data transmission system connecting a plurality of user I/O devices includes an optical path terminating at each user I/O device at a two port interface having a pair of optical transmitter and a pair of optical receivers for optically communicating the binary logic ONE and ZERO states and the system no data transmission state. A portion of the light transmitted over the optical path is fed back to the interface to control the transmitted light intensity. The two photodiode light receivers are closely matched in electrical characteristics and are biased by adjustable DC voltage sources so that the effects of photodiode dark currents on a trans-impedance amplifier are minimized.

6 Claims, 3 Drawing Sheets

HIGH INTEGRITY OPTICAL DATA TRANSMISSION SYSTEM

DESCRIPTION

1. Technical Field

This invention relates to optical data transmission systems, and more particularly to such systems having the ability to represent each of two logic states differently from the condition of no data transmission.

2. Background Art

In the prior art of user I/O device connection apparatus, it is known to use electrical wire as the data transmission media. For example, an aircraft data bus military standard, MIL-STD-1553B, specifies data transmission using a shielded twisted pair of wires. Information is transferred in the form of bipolar trilevel voltage signals (state)). The three voltage levels consist of +DC volts and —DC volts for transmission of the two active binary logic states, and zero volts when no data is transmitted. Therefore, this arrangement can uniquely signify three distinct system states between user I/O devices. Electrical wires, however, are subject to electrostatic, electromagnetic, and other interference effects.

One solution has been to use optical media for data transmission. Fiber optics has the inherent advantages of the lack of susceptibility to electric interference, greater media density, lower weight, potentially lower cost, higher data transmission rates, greater data security, and the absence of mutual interference between independent optical channels and between optical and wire channels. An optical data transmission standard, MIL-STD-1773, has been proposed as an optical alternative to MIL-STD-1553B.

However, a limitation with an optical data transmission scheme like MIL-STD-1773 is that data is transmitted along the optical bus in the form of bilevel optical signals. Optical power, in general, is turned on and off to represent the two active binary logic states (ONE, ZERO). In MIL-STD-1773, a third system state, no data transmission, is signified similarly to logic ZERO by turning off optical power. Thus, the ability to uniquely signify the no data transmission state of a trilevel system like MIL-STD-1553B is lost in a bilevel optical system like MIL-STD-1773. The result is lower system data integrity due to increased possibility of error in interpreting system status. Also, the bilevel Manchester data coding scheme specified by MIL-STD-1773 has an inherent low frequency signal component during message transmission which requires special signal processing techniques to compensate for its effect, as described by Relis, Matthew J., "Military Avionic LANs Point Toward Fiber Optics", *Defense Electronics*, October 1983, pp 87-106.

In the prior art, if the signal intelligence desired to be optically transmitted is in the form of trilevel electrical signals, e.g., as per the biphase Manchester code specified in MIL-STD-1553B, it is necessary to first convert the trilevel signals to bilevel electrical signals for use with an optical transmitter and bus, as illustrated in U.S. Pat. No. 4,654,844.

It is desirable to bidirectionally transmit the informational content of the three unique data states of a trilevel electrical signal system over an optical bus arrangement, such as the well-known transmissive star coupler or ring coupler, thus taking advantage of all the inherent benefits of optical communication technology while also retaining the higher integrity of a trilevel system as compared to a bilevel system.

DISCLOSURE OF INVENTION

An object of the present invention is to provide the high integrity of a trilevel signal system in bilevel optical signal communication between user I/O devices.

This invention is based in part on the fact that although light transmitters and light receivers are normally arranged in user I/O device connection arrangements such that optical power flows unidirectionally, optical fibers are capable of bidirectional optical power transmission.

According to the present invention, a high integrity optical signal transmission system connecting a plurality of user I/O devices includes an optical signal path for providing bidirectional transmission and reception of bilevel optical signals between user I/O devices, each end of the optical path being so disposed to two light transmitters and two light receivers such that one light transmitter/receiver pair is dedicated to transmission of logic ONE and reception of logic ZERO and the second light transmitter/receiver pair is dedicated to transmission of logic ZERO and reception of logic ONE, the optical path being responsive to optical power from the light transmitters and the light receivers being responsive to optical power transmitted in the optical path, the occasion where neither light transmitter is transmitting optical power signifying that no data is being transmitted on the optical path.

In further accord with the present invention, a portion of the transmitted optical power is returned by the optical path to control the transmitted light power level. In this way, the invention can automatically compensate for physical variations in the optical bus or for time-dependent variations in the optical bus due to aging or nuclear events. This feedback signal can also, but need not, be used by the transmitting user I/O device to control the data transmission protocol.

According to another aspect of the present invention, two electrical photodiodes, used as receivers to convert optical power representative of the two respective binary logic states to electrical current, are each disposed at the end of a branch of the optical path and are connected to an electrical, differential trans-impedance amplifier such that the effects of photodiode electrical dark currents on the amplifier are minimized.

The present invention transmits and receives three distinct data states, the two active binary logic states and a no data transmission state, between a plurality of user I/O devices using an optical path that lends itself to a clear differentiation between received light from a logic ONE light transmitter and received light from a logic ZERO light transmitter, in contrast with limiting transmission and reception to only two active logic states, with the no data transmission state, a third system state, being represented in the same way optically as one of the two active logic states. Thus, the present invention can uniquely signify the two active logic states and an inactive bus state while retaining the inherent advantages of optical media over conventional electrical wire.

Other objects, features and advantages of the present invention will become more apparent in the light of the following detailed description of exemplary embodiments thereof, as illustrated in the accompany drawings.

BEST MODE FOR CARRYING OUT THE INVENTION

Figure 1:
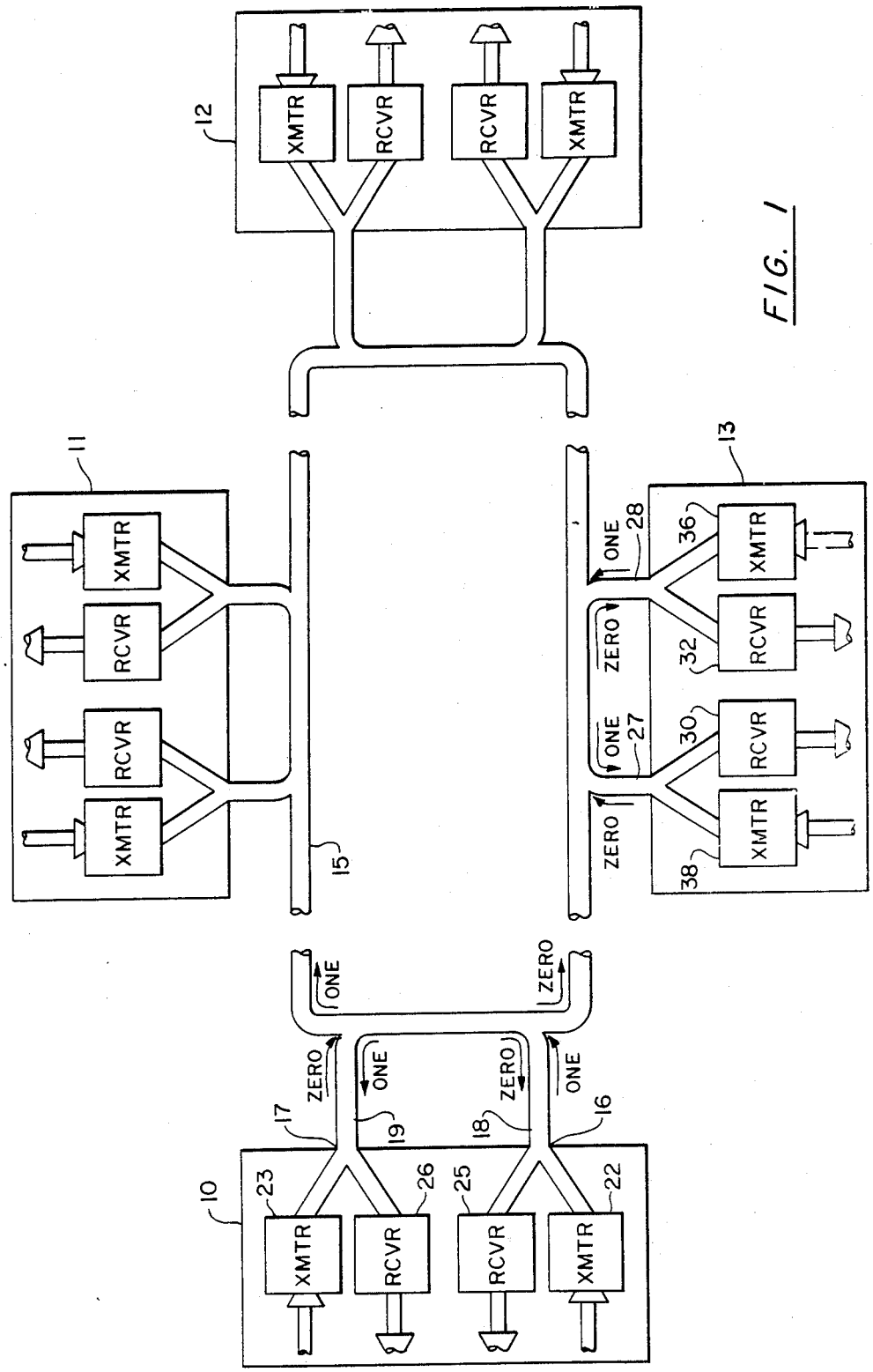
FIG. 1 is a simplified, illustrative block diagram of the high integrity optical data transmission of the present invention, interconnecting a plurality of user I/O devices.

Referring to FIG. 1, a simplified version of the high integrity optical data transmission system of the present invention includes a plurality of user I/O devices 10-13 interconnected by means of an optical path 15, which, in the example of FIG. 1, may comprise a well-known optical ring coupler. The optical path terminates at two ports 16,17 at each user I/O device 10-13. The optical path at each port is physically arranged in relation to one of two light transmitters (XMTR) 22,23 (which may be LEDs, i.e., Light Emitting Diodes, or other light sources) and to one of two light receivers (RCVR) 25,26 (which may be photodiodes) such that, at one port 16, the light transmitter 22 is dedicated to transmission of logic ON and the light receiver 25 is dedicated to reception of logic ZERO. At the second port 17, the light transmitter 23 is dedicated to transmission of logic ZERO and the light receiver 26 is dedicated to reception of logic ONE. In this arrangement, optical power is made to travel (e.g., advancement of the phase front) bidirectionally in the optical path 15, the direction determined by whether an I/O device 10-13 is transmitting a logic ONE or a logic ZERO.

Data transmission and reception can best be understood by example. Assume the user I/O device 10 is a transmitter and the user I/O device 13 is a receiver. For transmission of logic ONE, the light transmitter 22 sends optical power out through a branch 18, clockwise in the optical path 15, and downward through a branch 27 to a light receiver 30. For transmission of logic ZERO, the light transmitter 23 sends optical power out through a branch 19, counterclockwise through the optical path 15, and downward through a branch 28 to a light receiver 32. When no data is being sent by the user I/O device 10, both light transmitters 22,23 are off. In a second case, assume that the roles of the two user I/O devices 10,13 are reversed. For transmission of logic ONE, a light transmitter 36 sends optical power upward through the branch 28, clockwise in the optical path 15, and through the branch 19 to the light receiver 26. For transmission of logic ZERO, a light transmitter 38 sends optical power upward through the branch 27, counterclockwise in the optical path 15, and through the branch 18 to the light receiver 25. For no data transmission, both light transmitters 36,38 are off. In the second case, optical power is transmitted in opposite directions along the branches 18,19,27,28 from that in the first case.

It should be noted that the present invention does not limit the number of user I/O devices acting as receivers. In actuality, by using the well-known transmissive star coupler or ring coupler as part of the optical path, a portion of transmitted light from either the transmitting user I/O device's 10 logic ONE light transmitter 22 or its logic ZERO light transmitter 23 is received by the corresponding light receiver in every user I/O device 11-13 connected to the optical path 15, including the transmitting user I/O device 10 itself. That is, light receiver 26 receives light from light transmitter 22 and light receiver 25 receives light transmitted from light transmitter 23. Thus, each I/O device 10-13 can transmit and receive optical power to and from all I/O devices 10-13.

Figure 2:
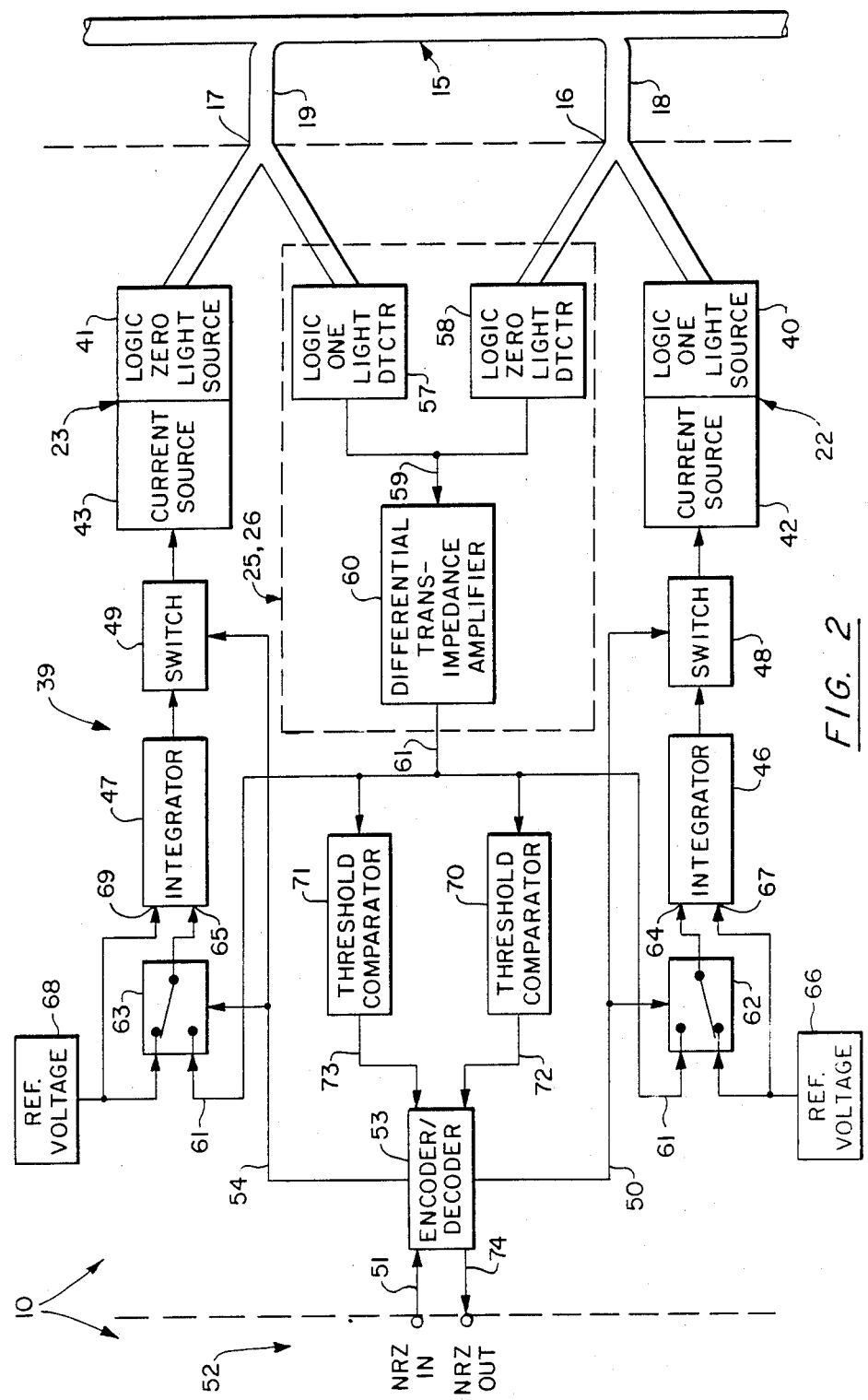
FIG. 2 is a system block diagram of circuitry for connection between a user I/O device and the optical path of the high integrity optical data transmission system of the present invention.

FIG. 2 illustrates an embodiment of circuitry 39 for connection between a user I/O device 10 and the optical path 15 of the high integrity data transmission system of the present invention. Each one of two light sources 40,41 has its own electrical current source 42,43. The amount of optical power output by each light source 40,41 is proportional to the amount of current supplied by the related current source 42,43. Each current source 42,43 derives its input signal from one of two integrators 46,47 through a related switch 48,49. Switch 48 is enabled to switch the output of the integrator 46 to the current source 42 by a signal on a line 50 whenever a logic ONE signal is applied on a line 51, in non-return to zero (NRZ) format, by a data processing section 52 of the user I/O device 10, to an encoder/decoder circuit 53, typically a Harris HD-15530 encoder/decoder. Switch 49 is enabled to switch the output of the integrator 47 to the current source 43 by a signal on a line 54 from the encoder/decoder 53 whenever a logic ZERO signal is applied on the line 51 to the encoder/decoder 53.

A pair of light detector photodiodes 57,58 sense optical power transmitted in the optical path 15 and convert the optical power to electrical current. The output of the photodiodes is fed on a line 59 to a differential trans-impedance amplifier 60, which outputs a bipolar analog electrical voltage on a line 61, the polarity depending on which photodiode is receiving optical power at the time. The amplifier output 61 is fed to a pair of switches 62,63. Switch 62 is enabled to switch the amplifier output 61 to one input 64 of the integrator 46 by a signal on the line 50 from the encoder/decoder 53 whenever a logic ONE is applied to the encoder/decoder 53 on the line 51. Switch 63 is enabled to switch the amplifier output 61 to one input 65 of the integrator 47 by a signal on the line 54 whenever a logic ZERO is applied to the encoder/decoder 53 on the line 51 Integrator 46 integrates the difference between the amplifier output 61 and a reference voltage 66 connected to a second input 67 of the integrator 46. Integrator 47 integrates the difference between the amplifier output 61 and a reference voltage 68 connected to a second input 69 of the integrator 47. Due to the bipolar nature of the amplifier output 61, either the output of the integrator 46 or the output of the integrator 47 might require signal inversion before being applied to the related current source 42,43. When switch 62 is disabled, the two inputs 64,67 of the integrator 46 are connected to the reference voltage 66; when switch 63 is disabled, the two inputs 65,69 of the integrator 47 are connected to the reference voltage 68. This results in the integrators 46,47 holding their output voltage at the present level until the next time the related switch 62,63 is enabled. In this way, the integrators 46,47 represent the last transmitted optical power level of the related light source 40,41. By feeding the amplifier output 61 back to the integrators 46,47, the invention controls the light source optical power level to compensate for physical variations in the optical bus or to compensate for time-dependent variations in the optical bus due to aging or nuclear events.

The amplifier output 61 is also fed to a pair of logic threshold comparators 70,71. The first comparator 70 senses when the amplifier output 61 exceeds a +DC volts threshold and signals the encoder/decoder 53 on a line 72. The second comparator 71 senses when the amplifier output 61 drops below a −DC volts threshold and signals the encoder/decoder 53 on a line 73. The encoder/decoder 53 assembles the two signals 72,73 into a single NRZ signal on a line 74 to the data processing section 52 of the user I/O device 10. If the user I/O device 10 is acting as a receiver, the signal 74 represents the data sent over the optical path 15 by the transmitting user I/O device. If the user I/O device 10 is acting as a transmitter and the well-known transmissive star coupler or ring coupler is used as the optical path such that a portion of the transmitted optical power out of either light source 40,41 is fed back to the user I/O device 10 on the respective branches 18,19, then the signal on the line 74 represents the data sent on the optical path 15 by the transmitting user I/O device 10. In this case, since the data processing section 52 of the user I/O device 10 is transmitting, the user I/O device 10 can, but need not, use the signal on the line 74 to control data transmission protocol.

Figure 3:
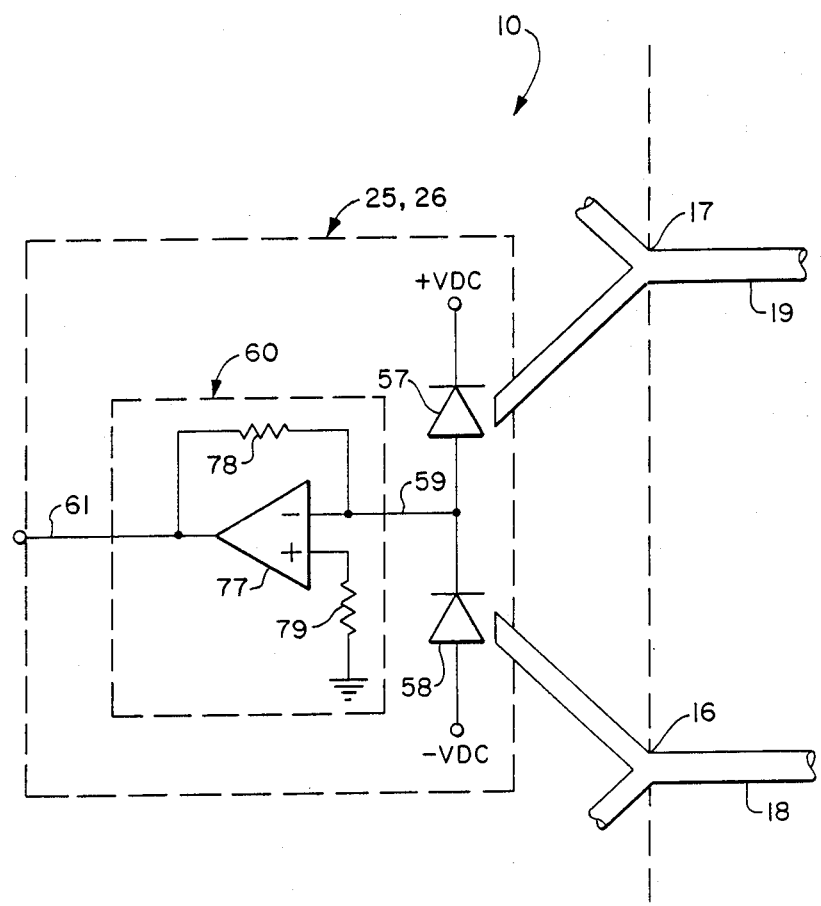
FIG. 3 is a schematic diagram of a circuit configuration of two photodiodes and a differential trans-impedance amplifier for sensing received optical power and converting it to electrical voltage.

FIG. 3 illustrates the arrangement of the light receivers 25,26 and the differential trans-impedance amplifier 60, in accordance with the present invention, for receiving optical power transmitted over the optical path 15 and converting the optical power to an electrical voltage. The photodiode 57 is disposed at the port 17 to receive optical power signifying a logic ONE transmitted to the user I/O device 10 through the branch 19. The photodiode 57 induces an electrical current to flow on the line 59 in proportion to the sensed optical power. An operational amplifier 77 and two resistors 78,79 are disposed to convert current on the line 59 into a voltage on the line 61. The direction of current on the line 59 induced by the photodiode 57 is such that a negative polarity voltage is produced at the output of the operational amplifier 77 on the line 61. The photodiode 58 is disposed at the port 16 to receive optical power signifying a logic ZERO transmitted to the user I/O device lo through the branch 18. The photodiode 58 induces a current to flow on the line 59 in proportion to the sensed optical power. The direction of the current is such that a positive polarity voltage is produced at the output of the operational amplifier 77 on the line 61. When neither photodiode 57,58 is sensing optical power, the differential trans-impedance amplifier output 61 is zero volts. The photodiodes 57,58 are closely matched in electrical characteristics and are biased by adjustable DC voltage sources so that the effects of photodiode dark currents on the operational amplifier 77 tend to offset each other and are therefore nearly cancelled.

Although the circuitry 39 has been shown to process NRZ signals, circuitry could be readily implemented to process other signals, such as the return to zero (RZ), trilevel biphase Manchester code used in MIL-STD-1553B. In this Way, the invention could be made to interface to existing MIL-STD-1553B equipment. As shown, the circuitry 39 is a physical part of a user I/O device 10. Of course, the circuitry 39 could be designed to be stand alone and not a part of any user I/O device. As shown in FIG. 2, the high integrity optical data transmission system of the present invention interfaces with electrical devices. However, laser or optic devices could be used instead. Thus, the signals controlling the transmitters, and the signals provided by the receivers can be optical or electrical. Also, the optical path has been described in terms of common optical components, such as the well-known ring coupler, for ease of understanding the bidirectional concepts of the invention. However, the optical path may be implemented with a known transmissive star coupler (such as that provided by Canstar) which is, in fact, the only way the invention has been practiced, or with other optical path arrangements, in an appropriate fashion which should be readily apparent to those skilled in the art in the light of the foregoing description. Also, optical power as used herein does not necessarily imply visible optical power; the optical power could be ultraviolet, infrared, etc. All of the foregoing changes and variations are irrelevant to the invention, it suffices that the optical path be so disposed to two light sources and two light detectors such that the high integrity of a trilevel signal system is achieved by bidirectional optical signal transmission between user I/O devices.

Although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An optical transceiver for high integrity optical binary signal transmission between a plurality of user I/O devices along an optical path having a plurality of interfaces for the respective user I/O devices, each interface having first and second optical path branches terminating at corresponding first and second ports, said first branch of each of said interfaces disposed to propagate optical signals in a first direction in said path, said second branch of each of said interfaces disposed to propagate the optical signal propagating in said first direction in said path to the related one of said second ports, said second branch disposed to propagate optical signals in a second direction in said path, said first branch of each of said interfaces disposed to propagate the optical signal propagating in said second direction in said path to the related one of said first ports;

said optical transceiver comprising:

a first optical receiver disposed to respond to an optical signal propagated to said first port of one of said interfaces to provide a signal indicative of binary ONE for use by said related one of the user I/O devices;

a second optical receiver disposed to respond to an optical signal propagated to said second port of said one interface to provide a signal indicative of binary ZERO for use by said related one of the user I/O devices;

a first optical transmitter disposed to transmit optical power in said first optical branch of said one interface in response to a signal indicative of binary ZERO from said related one of the user I/O devices; and a second optical transmitter disposed to transmit optical power in said second optical branch of said one interface in response to a signal indicative of binary ONE from said related one of the user I/O devices, whereby said first and second optical transmitters transmit optical power in opposite directions to represent binary ZERO and ONE respectively, and transmit no optical power to represent no data transmission from said related one of the user I/O devices.

2. The transceiver of claim 1, wherein said first and second receivers respectively include first and second light detector photodiodes for converting sensed optical power into electrical current;

characterized by:

a single electronic operational amplifier circuit, having as input electrical current from said photodiodes, for converting the current into a bipolar electrical voltage, said photodiodes being closely matched in electrical characteristics, the cathode of one of said photodiodes being connected to a +DC voltage source, the anode of said one photodiode and the cathode of the other photodiode being connected to the inverting input of said operational amplifier circuit, and the anode of said other photodiode being connected to a −DC voltage source, whereby said arrangement of said photodiodes is such that the effects of dark currents in said photodiodes on said amplifier are minimized.

3. The transceiver of claim 2, wherein said DC voltage sources are adjustable, whereby the voltage of said sources may be adjusted to further reduce the effects of dark currents in said photodiodes.

4. The transceiver according to claim 1 further comprising means for receiving electrical signals from a user I/O device connected at said interface and for providing in response thereto signals representing binary ONEs to said second optical transmitter and signals representing binary ZEROs to said first transmitter, and responsive to said first optical receiver for providing electrical signals representing binary ONEs to said user I/O device, and responsive to said second optical receiver for providing electrical signals representing binary ZEROs to said user I/O device.

5. The transceiver according to claim 1 further comprising conversion means for receiving signals representing both binary ONEs and binary ZEROs on a single output signal channel in a coded form from a user I/O device connected at said interface and for providing signals to said first optical transmitter in response to signals in said coded form on said single output signal channel representing binary ZEROs and for providing signals to said second optical transmitter in response to signals in said coded form on said single output signal channel representing binary ONEs, said conversion means responsive to signals respectively representing binary ONEs and ZEROs from said first and second optical receivers for providing signals correspondingly representing binary ONEs and binary ZEROs in said form on a single input signal channel to said user I/O device.

6. The transceiver of claim 1, further characterized by means for providing control of the optical power level of said first and second transmitters, said means comprising means for connecting to said first transmitter a signal provided by said first optical receiver indicative of binary ONE and proportional to the amount of optical power received by said first receiver, and for connecting to said second transmitter a signal provided by said second optical receiver indicative of binary ZERO and proportional to the amount of optical power received by said second receiver, each said first and second transmitters adjusting its transmitted optical power level in response to a corresponding one of said signals from said first and second receivers.

* * * * *

UNITED STATES PATENT AND TRADEMARK OFFICE
CERTIFICATE OF CORRECTION

PATENT NO. : 4,850,043

DATED : July 18, 1989

INVENTOR(S) : Charles R. Winston

It is certified that error appears in the above-identified patent and that said Letters Patent is hereby corrected as shown below:

Column 3, line 4, after "transmission" insert --system--.

Column 3, line 31, change "ON" to --ONE--.

Signed and Sealed this

Eleventh Day of December, 1990

Attest:

HARRY F. MANBECK, JR.

Attesting Officer

Commissioner of Patents and Trademarks